June 10, 1958 W. P. MASON 2,838,741
UNDERWATER SOUND DETECTION SYSTEM
Filed April 27, 1953 2 Sheets-Sheet 1

PARTICLE VELOCITY

PARTICLE VELOCITY

PARTICLE VELOCITY

INVENTOR
W. P. MASON
BY
ATTORNEY

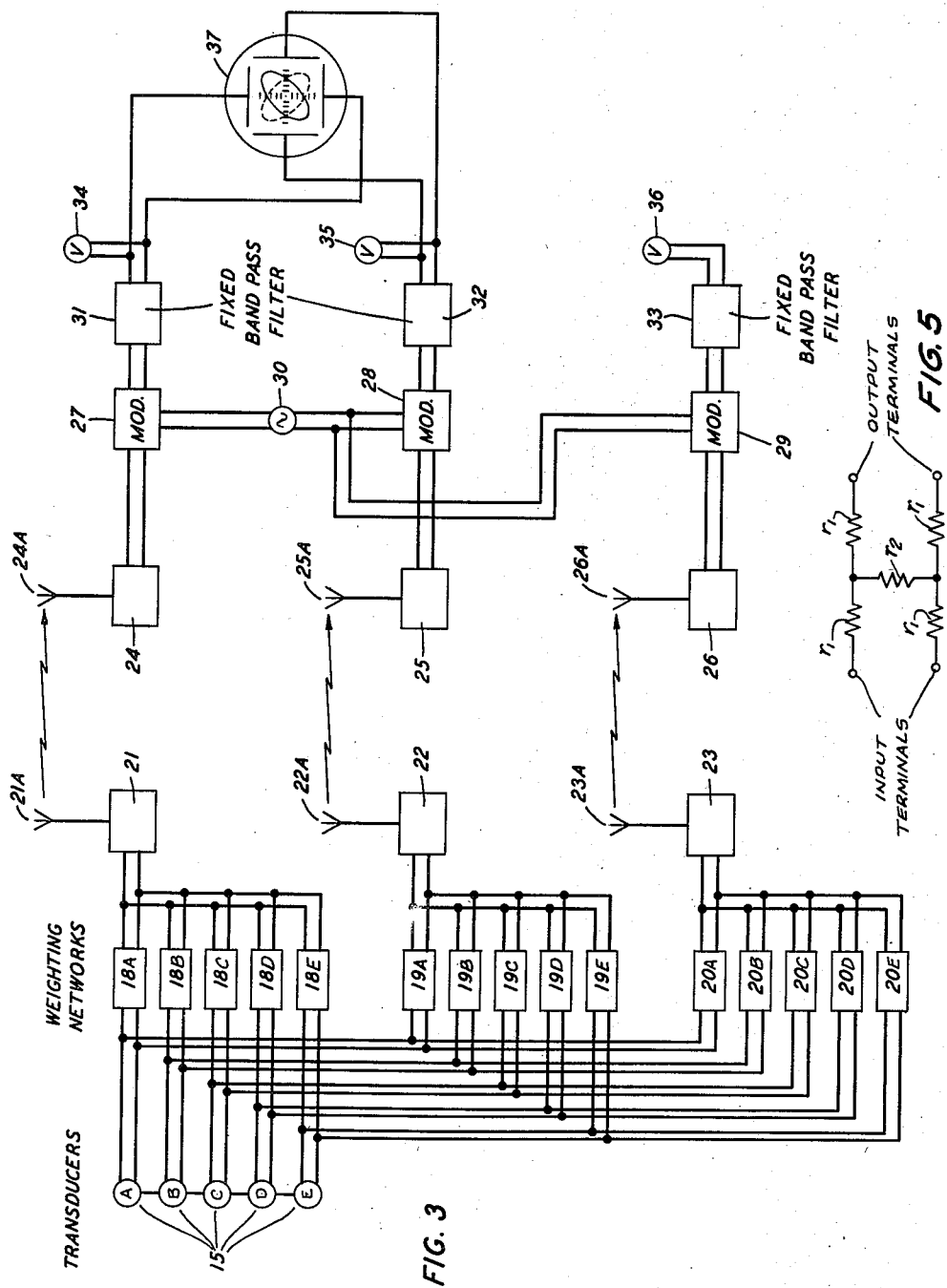

United States Patent Office 2,838,741
Patented June 10, 1958

2,838,741
UNDERWATER SOUND DETECTION SYSTEM

Warren P. Mason, West Orange, N. J., assignor to Bell Telephone Laboratories, Incorporated, New York, N. Y., a corporation of New York Application April 27, 1953, Serial No. 351,339

15 Claims. (Cl. 340—2)

This invention relates to the transmission of vibrational waves in a fluid medium and particularly to apparatus for determining the location of a source of vibrational waves in a transmission medium operating with a wave guide characteristic.

It is a general object of this invention to improve methods of transmission and detection of vibrational waves in a fluid medium.

A fluid medium is known to be capable of propagating vibrational energy in the form of pressure waves radially from a source placed therein and this knowledge has been widely exploited in systems for detecting and locating sources of underwater sound. However, in such sonic underwater systems the receiving frequencies have been limited to a high range wherin there is a low signal to noise ratio and locating the source is limited to a determination of the direction of the sound relative to the listening means. Such systems, due to the low signal to noise ratio, are accurate only at short distances and as they are limited to a determination of direction alone are by themselves inadequate for the purposes of supplying information needed in pursuing effective antisubmarine warfare, for example.

It is an object of this invention to improve the distance of detection of a pressure wave source in a fluid medium.

It is a further object of the invention to provide a transmission system for fluid mediums whereby accurate information concerning the location and movement of the source of pressure waves in the medium can be determined.

A more specific object of this invention is to provide apparatus for detecting the location and movement of submarines in geological shelf areas of the ocean by receiving and measuring the sounds emitted therefrom.

It has been observed that a body of water having a substantially constant depth acts as a wave guide medium and is a dispersive medium propagating sounds having different cut-off frequencies and different phase frequency characteristics in distinctive wave modes. The relative amplitudes of the wave modes propagated vary with the depth of the source from which sound is emitted and each mode has a particular phase velocity. By measuring the change in phase between particular modes and the relative amplitudes of the particular modes transmitted in the fluid medium, information concerning the depth, position, direction, and velocity of movement of the source can be determined.

The present invention contemplates in one embodiment apparatus for the detection of sound sources immersed in a fluid body of substantially constant depth. The apparatus comprises a plurality of chains of spaced sound receiving devices suspended vertically in the fluid for converting the sound waves into electrical energy and electrical networks for weighting the outputs from the receiving devices to separate the signals of the particular modes and to secure signal outputs proportional to the amplitudes of the wave modes. Filter means are employed for selecting frequencies to be observed, hereinafter often referred to as listening frequencies which are utilized in a phase measurement apparatus for determining the change of phase between modes with change in listening frequency, and with time, and in amplitude measurement apparatus for determining the relative amplitudes of the wave modes. With the information as to the change in phase between modes with change in listening frequency, and with time, the radial distance and radial velocity, respectively, of the sound with respect to the receiving devices may be determined. A comparison of such determinations derived from the apparatus for two or more spaced chains determines the position, direction of movement and velocity of movement of the source. The amplitude measurement apparatus provides information whereby the depth of the sound source in the fluid medium can be determined.

The invention and its objects will be better understood by referring to the following description and the accompanying drawings forming a part thereof wherein:

Fig. 3 is a circuit diagram in block schematic form of the apparatus in accordance with the invention;

Fig. 5 is a circuit diagram of a typical weighting circuit which may be employed according to the invention.

Figure 1:
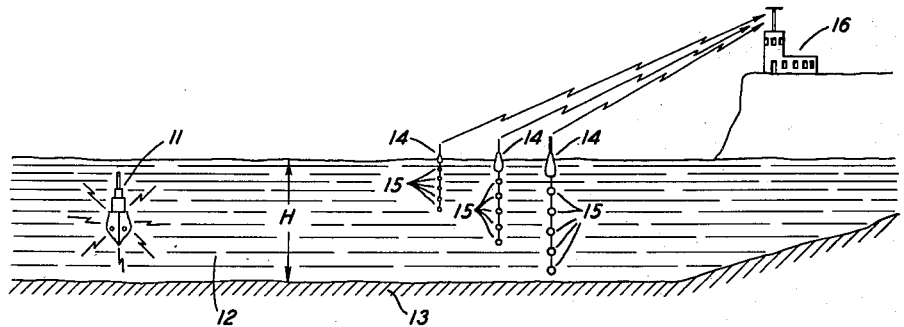
Fig. 1 is a representative showing of the apparatus according to the invention as used to determine the location of a submarine.

Referring more specifically to the drawings, Fig. 1 shows, by way of example, apparatus according to the invention as adapted for use in detecting the location and movement of a sound source in a body of water of substantially constant depth. A sound source 11, which, by way of example, may be a submarine, is shown in a body of water 12 having depth H and a floor of rock or other material 13 of high mechanical impedance. At appropriately spaced distances in thhe body of water sonobuoys 14 are located from which chains of hydrophones 15 are suspended in the water. Sounds transmitted through the body of water 12 are picked up by the hydrophones, translated into electrical energy, separated according to wave modes, and relayed to a shore station 16. By utilizing the electrical energy in a manner as described below, the depth, destination, direction and velocity of movement of the submarine can be determined.

A body of water of a relatively constant depth H having a pressure release surface, that is, a surface that will not support a pressure normal to it, and a high mechanical impedance bed 13 acts like a wave guide and is a dispersive medium, that is, a medium which will support wave transmission of various modes therein which modes travel at different wave velocities. These conditions are satisfied, for example, in the geological shelf areas lying off the North American Continent. In such a dispersive medium a low frequency cut-off $f_c$ for the lowest order or dominant mode is established by $$f_c = \frac{v}{4H} \qquad (1)$$

where $v$ is the velocity of sound in the medium and $H$ is the distance from the surface to the bed rock. The expression for the propagation constant $\Gamma r$ in the medium is $$\Gamma r = \frac{2\pi r}{v}\sqrt{(mf_c)^2 - f^2} \qquad (2)$$

Figure 2A:
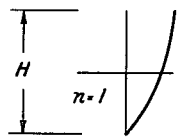
Figs. 2A, 2B and 2C show characteristics of sound waves of the dominant, second order and third order modes, respectively, transmitted from the submarine in the body of water of Fig. 1.
Figure 2B:
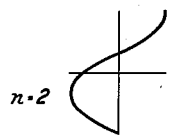
Figure 2C:
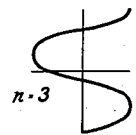

$r$ being distance measured from the source, $f$ the listening frequency or frequency observed, and $m=1, 3, 5, 7$ etc., where $mf_c$ determines the cut-off frequency for the various modes. Hence, the fundamental mode ($n=1$) shown in Fig. 2A has a cut-off frequency of $f_c$, the second order mode ($n=2$) shown in Fig. 2B has a cut-off frequency of $3f_c$ and the third order mode ($n=3$) shown in Fig. 2C has a cut-off frequency of $5f_c$. In oceanic shelf areas these cut-offs are at relatively low frequencies and these modes have a high signal to noise ratio, which insures that submarine signals from a long distance away can be heard in the presence of local sources of noise. Each of the particular modes travels at a different velocity and has a distinct amplitude. These features are utilized to determine the location and the movement of the source. In Figs. 2A, 2B and 2C, the vertical direction represents the depth H of the body of water and the horizontal direction represents the particle velocities in each wave mode. Other modes of higher orders are transmitted and the modes shown have been selected only for purposes of illustration.

Fig. 3 illustrates the circuit of the apparatus according to the invention for utilizing wave modes to determine the location and movement of a sound source from which the wave modes are emitted. The sound waves in the water are picked up by the hydrophones 15, each of which is connected to weighting networks 18, 19 and 20. The specific hydrophones 15 in each chain are further designated by the reference characters A, B, C, D, and E, the hydrophone E being at or near the bottom of the body of water and the hydrophones A, B, C, and D being equally spaced between the surface of the water and the hydrophone E. The individual weighting networks 18 and 19 and 20 to which the hydrophones A, B, C, D and E are connected are given the same respective subreference characters A, B, C, D and E. The hydrophone is a transducer adapted for underwater use whereby the pressure waves are translated into electric energy. The hydrophone 15 may, for example, be of a type disclosed in U. S. Patent 2,432,083 issued December 9, 1947, to R. B. Black, Jr., et al., having a low order of distortion and attenuation in the signal transmission from the water to the transducer unit with reproducible-frequency response characteristics. In the weighting networks 18, 19, and 20 the translated energy is separated into electrical signals according to wave modes. These electrical signals are combined according to wave modes, passed to transmitters 21, 22, and 23, respectively, and applied to transmitting antennae 21A, 22A, and 23A. The apparatus mentioned is all included in or connected to a sonobuoy 14 as shown in Fig. 1. At the shore station 16 the separate wave mode signals are picked up by receiving antennae 24A, 25A and 26A, applied to receivers 24, 25, and 26 and carried to connecting modulators 27, 28, and 29. A variable carrier frequency is supplied to the modulators from a source 30 and the modulated signals are carried to low frequency bandpass filters 31, 32, and 33 which are adjusted to the same frequency. The outputs from the filters are connected respectively to voltmeters 34, 35, and 36 and the outputs from filters 31 and 32 are also connected respectively to the vertical and horizontal plates of an oscilloscope 37.

The weighting networks 18, 19, and 20 which may be of an attenuation pad type are utilized to separate the signals of the different modes received by the transducers 15 and also to determine the relative amplitudes of the signals of the various modes. It can be shown that by individually weighting the outputs from each of the transducers of a chain by the functions $$\cos\frac{\pi z}{2H},\ \cos\frac{3\pi z}{2H}\ \text{and}\ \cos\frac{5\pi z}{2H}$$

where $z$ is the distance of the particular transducer from the floor of the body of water, that the signals so weighted are respectively the signals of the dominant mode, second order and third order mode. In the present case, networks 18 weight the signals received by the transducers 15 according to the function $$\cos\frac{\pi z}{2H}$$

networks 19 weight the signals according to the function $$\cos\frac{3\pi z}{2H}$$

and networks 20 weight the signals according to the function $$\cos\frac{5\pi z}{2H}$$

In addition, by combining the outputs of the networks for each of the individual weighting functions the relative amplitudes of the modes may be determined. Hence, the combined output of networks 18 is electrical energy representative of the amplitude of the dominant mode, the combined output of the networks 19 is electrical energy representative of the amplitude of the second order mode and the combined outputs of the networks 20 is electrical energy representative of the amplitude of the third order mode.

An attenuator pad suitable for use in the weighting networks 18, 19, and 20 is the H type pad shown by way of example in Fig. 5. Hence for networks 18 which are weighted according to the function $$\cos\frac{\pi z}{2H}$$

the specific weighting functions $w$ are:

| | |
|---|---|
| 18A | .309 |
| 18B | .588 |
| 18C | .809 |
| 18D | .954 |
| 18E | 1.0 |

In the circuit of Fig. 5 the values of the resistors $r_1$ and $r_2$ are determined according to the following equations:

$$r_1 = \frac{Ro}{2}\frac{(1-w)}{(1+w)} \qquad (3)$$

$$r_2 = Ro\frac{(2w)}{(1-w^2)} \qquad (4)$$

where $w$ is the weighting function and $Ro$ is the output impedance of the hydrophone. It is possible for the weighting function $w$ to have a negative designation which dictates that a phase reversal must take place in the attenuation pad. In the network of Fig. 5 this can be accomplished by using a transformer as an output coupler.

The radial distance of the sound source from a transducer chain can be determined by measuring the change of phase between modes with change in listening frequency. The imaginary portion of the expression for the propagation constant $\Gamma r$ in Equation 2 expresses the phase $\beta$ of a mode and is written:

$$\beta = \frac{2\pi r}{v}\sqrt{f^2 - (mf_c)^2} \qquad (5)$$

Thus the difference in phase between the first two modes is:

$$\Delta\beta = \beta_1 - \beta_2 = \frac{360r}{v}\left[\sqrt{f^2 - f_c^2} - \sqrt{f^2 - (3f_c)^2}\right] \qquad (6)$$

By differentiating this change in phase with respect to change in frequency keeping $r$ constant, the following expression is derived:

$$\frac{d\beta}{df} = \frac{\Delta\beta}{\Delta f} = \frac{360 r f}{v}\left[\frac{1}{\sqrt{f^2-f_c^2}} - \frac{1}{\sqrt{f^2-(3f_c)^2}}\right] \quad (7)$$

Solving for $r$ $$r = -\left(\frac{\Delta\beta}{\Delta f}\right)\left(\frac{v}{360 f}\right)\left[\frac{(\sqrt{f^2-f_c^2})(\sqrt{f^2-(3f_c)^2})}{\sqrt{f^2-f_c^2}-\sqrt{f^2-(3f_c)^2}}\right] \quad (8)$$

Thus by measuring the change in phase $\Delta\beta$ between two modes with change in listening frequency $\Delta f$ the radial distance $r$ of the sound source from the listening means can be determined. In the apparatus of Fig. 3 change in phase with change in listening frequency is determined by modulating the signals due to the dominant and second order modes, for example, with a fixed carrier frequency in modulators 27 and 28, passing the modulated signals through fixed frequency pass band filters 31 and 32, respectively, whereby signals of a frequency $f$ are passed and then applying the signal from filter 31 to the vertical plates of oscilloscope 37 and the output from filter 32 to the horizontal plates thereof. On the screen of the oscilloscope the phase difference $\beta$ between the two modes can be observed. The listening frequency $f$ can be varied an amount $\Delta f$ by varying the carrier frequency the same amount $\Delta f$. This will cause the phase difference between the two modes to change by an amount $\Delta\beta$ which change in phase may be read directly from scales on or adjacent to the face of the oscilloscope. That change in phase $\Delta\beta$ along with the change in listening frequency $\Delta f$ may be used in the above equation 8 to determine the radial distance. It is clear that if two or more chains of transducers are used as shown in Fig. 1 that a distance $r$ from each chain may be determined and the position of the submarine sound source relative to the chains may be definitely fixed.

It can be further shown from Equation 6 that the radial velocity $v_r$ of a sound source relative to a listening means may be expressed in terms of change in phase between modes with time. By differentiating Equation 6 with respect to time $$\frac{d\beta}{dt} = \frac{\Delta\beta}{\Delta t} = \frac{360\frac{dr}{dt}}{v}\left[\sqrt{f^2-f_c^2} - \sqrt{f^2-(3f_c)^2}\right] \quad (9)$$

and by solving for $\frac{dr}{dt}$ $$\frac{dr}{dt} = v_r = \frac{\Delta\beta}{\Delta t}\left[\frac{360}{v}\frac{1}{(\sqrt{f^2-f_c^2}-\sqrt{f^2-(3f_c)^2})}\right] \quad (10)$$

it is shown that the radial velocity $v_r$ of a sound source relative to a listening means may be determined by observing the change in phase $\Delta\beta$ between two modes with respect to time $\Delta t$. The change in phase between modes with time is determined as in the above case by modulating the dominant and second order modes and passing the modulated signals through band pass filters to obtain signals of a frequency $f$ which are applied to the plates of the oscilloscope 37 where the phase difference $\beta$ is observed. However, in this instance the signals applied to the oscilloscope are maintained at a fixed frequency $f$ and the change of phase $\Delta\beta$ in a time $\Delta t$ is observed on the face of the oscilloscope. With this information, the radial velocity of the source relative to the chain of transducers may be obtained from the above Formula 4. From the information derived from two or more chains of transducers the velocity and direction of movement of the source relative to the chains may be determined.

Figure 4A:
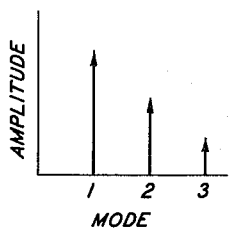
Figs. 4A, 4B and 4C show the amplitudes of the dominant, second order and third order modes, respectively, when the submarine of Fig. 1 is at mid-depth, at the surface and at the bottom, respectively, of the body of water.
Figure 4B:
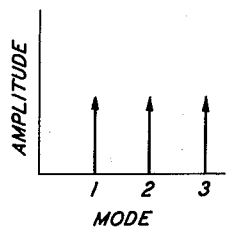
Figure 4C:
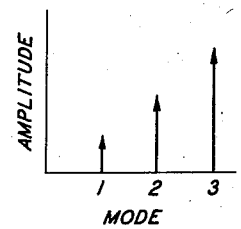

To determine the depth of the submarine, it is necessary only to compare the relative amplitudes of the signals from the different modes. While the depth may be determined by observing the amplitudes of two modes, it is desirable for greater accuracy to use three or more modes. The signals from the various modes are modulated and filtered in a manner as described above for observing the change of phase with time, and the amplitudes of the signals at a fixed frequency $f$ are read directly on voltmeters 34, 35, and 36 shown in Fig. 3. For a submarine at mid-depth $H/2$ the amplitude of the signal for the fundamental mode ($n=1$) will be largest and the amplitude of the signals of the other modes will diminish with each ascending order mode as shown in Fig. 4A. The amplitudes of the signals of the modes for a submarine at the surface of the body of water will be substantially equal as shown in Fig. 4B. For a submarine at the bottom of the body of water the amplitudes of the signals for the fundamental mode will be smallest and the signals will increase in amplitude with each ascending order wave mode. The actual amplitudes of the signals for each mode may be determined by mathematical computation or more desirably by calibration of the apparatus in a body of water using a sound source at different depths. Calibration methods may also be used in determining the change of phase between modes unique to particular distances and particular velocities and such methods are especially well suited where the floor of the body of water is uneven or sloping, and where particular topography in the neighborhood of the listening chains of transducers must be taken into consideration.

It is clear that the apparatus can be used not only for the detection and location of a submarine source in a body of water, but also for the detection and location of any sound source in any fluid medium.

It is also clear that any of the components of the apparatus in accordance with the invention can be used by themselves or in combination with other spaced components to determine specifically radial distances, radial velocities or depths of sound sources.

The advantages of the above-described apparatus are many. Not only does the apparatus utilize heretofore unexploited natural phenomenon in a fluid medium to detect the location and movement of an object therein, but it also accurately fixes the depth, distance, direction, and velocity of movement of the object entirely from the sounds emitted therefrom. Another advantage is that it utilizes low frequency siganls wherein the signal to noise ratio is high thereby permitting the clear reception of signals from a long distance. A further advantage is that the apparatus provides simple, inexpensive and easily maintained means for permanent antisubmarine installations.

It is understood that the above-described arrangements are illustrative of the application of the principles of the invention. Numerous other arrangements might be devised by others skilled in the art without departing from the spirit and scope of the invention.

What is claimed is:

1. A wave guide adapted to transmit vibrational waves of distinctive wave modes in one form of energy and means located in said wave guide to translate the distinctive wave modes of said vibrational waves into energy of a different form.

2. A wave guide adapted to transmit sound waves of different modes and means located therein to translate the different modes of said sound waves into electric energy.

3. In a fluid medium adapted to transmit vibrational waves of one form of energy in distinctive wave modes, means for translating the distinctive wave modes of said vibrational waves into energy of a different form.

4. In a fluid medium adapted to transmit pressure waves in distinctive modes, means including a plurality of transducers for translating said pressure waves into electric energy according to wave modes and means connected to said transducers for combining the electric energy of like modes.

5. In combination a wave guide adapted to transmit pressure waves of different modes, means located in said wave guide to translate said pressure waves into electric energy and means to separate said electric energy according to said wave modes.

6. In combination, a wave guide adapted to transmit sound waves of different modes, means for introducing sound waves into said wave guide, means located in said wave guide for translating said sound waves into electric energy means for separating said electric energy according to said modes, and means for comparing said energy of said modes whereby the position and movement of said sound wave introducing means relative to said translating means can be determined.

7. An apparatus for locating a sound source in a fluid medium comprising means for receiving sound waves of different modes emitted from said sound source, and means for comparing said modes whereby the radial distance, the radial velocity of said source relative to said receiving means and the depth of said source are determined.

8. An apparatus for locating a sound source in a fluid medium according to claim 1 wherein said fluid medium is of a substantially constant depth.

9. An apparatus for locating a sound source in a fluid medium according to claim 1 wherein said translating means comprises a plurality of spaced sound detectors.

10. An apparatus for locating a sound source in a fluid medium, said sound source emitting waves of different wave modes, comprising means for translating said waves into electrical signals, means for separating the signals according to said modes, means for selecting frequencies from said mode signals, means for changing said selected frequencies and means for measuring the change of relative phase between mode signals with change in selective frequency whereby the radial distance of said source relative to said receiving means is determined.

11. An apparatus for locating a sound source in a fluid medium, said sound source emitting waves of different wave modes, comprising means for translating said waves into electrical signals, means for separating the signals according to the modes and means for measuring the change of relative phase between signals with time whereby the radial velocity of said source relative to said receiving means is determined.

12. An apparatus for locating a source of sound waves in a fluid medium, said sound source emitting waves of different wave modes, comprising means for receiving sound waves emitted from said sound source, said receiving means comprising a plurality of sound detectors spaced in a substantially vertical line in said medium, means at each of said detector for translating said waves of different modes into electrical signals, means for separating the signals according to said modes, means for combining the signals from said detectors for each said mode and means for measuring the relative amplitudes of said combined signals whereby the depth of said sound source is determined.

13. An apparatus for locating a sound source in a fluid medium of a substantially constant depth, said sound source emitting waves of different modes, comprising means for receiving sound waves of different modes emitted from said source, means for translating said waves into electrical signals, means for separating the signals according to said modes, and means for selecting frequencies from said mode signals, means for varying said selected frequencies, and means for measuring the change of phase between mode signals with change in selective frequency to determine the radial distance of said source and for measuring the change of phase between mode signals with time to determine the radial velocity of said source relative to said receiving means.

14. An apparatus for locating a source of sound waves in a fluid medium of substantially constant depth, said sound waves being of different wave modes, comprising means for translating sound waves emitted from said sound source into electric signals, said means comprising a plurality of chains of electro-mechanical transducers, each said chains being suspended in a substantially vertical line in said medium, means including weighting networks for separating said signals of each said transducer according to said modes, means for combining said signals for each said mode, means for selecting frequencies from each said combined signals, means for changing the selected frequency of said combined signals, means for measuring the change in relative phase between combined signals consecutively, with change in frequency, and with time, and means for measuring the amplitudes of said combined signals whereby the position, the direction of movement, velocity of movement and depth of said source can be determined.

15. A method for determining the location of a sound source in a fluid medium of constant depth, said sound source emitting waves of different wave modes, comprising the steps of receiving sound waves from said source, translating said received sound waves into electrical signals corresponding to the different modes, selecting a listening frequency band from said electrical signals, measuring the relative amplitudes of said modes to determine the depth of said sound source, measuring the change in phase between modes with time to determine the radial velocity of said source, varying the listening frequency of said receiving means, and measuring the change of phase between modes with change of frequency to determine the radial distance of said source.

No references cited.